(12) United States Patent
Nakamura et al.

(10) Patent No.: US 9,458,034 B2
(45) Date of Patent: Oct. 4, 2016

(54) METHOD OF MEMBRANE SEPARATION

(75) Inventors: Taeko Nakamura, Tokyo (JP); Kenji Kowata, Tokyo (JP); Katsumi Matsumoto, Tokyo (JP)

(73) Assignee: KURITA WATER INDUSTRIES LTD., Nakano-ku, Tokyo (JP)

( * ) Notice: Subject to any disclaimer, the term of this patent is extended or adjusted under 35 U.S.C. 154(b) by 107 days.

(21) Appl. No.: 14/127,997

(22) PCT Filed: Jul. 5, 2012

(86) PCT No.: PCT/JP2012/067155
§ 371 (c)(1),
(2), (4) Date: Dec. 20, 2013

(87) PCT Pub. No.: WO2013/005787
PCT Pub. Date: Jan. 10, 2013

(65) Prior Publication Data
US 2014/0124442 A1 May 8, 2014

(30) Foreign Application Priority Data
Jul. 6, 2011 (JP) .................. 2011-150398

(51) Int. Cl.
*B01D 61/08* (2006.01)
*C02F 1/76* (2006.01)
(Continued)

(52) U.S. Cl.
CPC ............. *C02F 1/441* (2013.01); *B01D 61/025* (2013.01); *B01D 61/04* (2013.01); *B01D 65/08* (2013.01); *C02F 1/76* (2013.01); *B01D 2311/04* (2013.01);
(Continued)

(58) Field of Classification Search
CPC ...................................................... C02F 1/441
See application file for complete search history.

(56) References Cited

U.S. PATENT DOCUMENTS 3,558,503 A * 1/1971 Goodenough ............. 252/187.2
2006/0032823 A1 * 2/2006 Harrison et al. ............. 210/754
(Continued)

FOREIGN PATENT DOCUMENTS

JP 07-087914 B2 9/1995
JP 09-038648 2/1997
(Continued)

OTHER PUBLICATIONS

Nov. 2008; GE PDF.*
(Continued)

*Primary Examiner* — Allison Fitzsimmons
(74) *Attorney, Agent, or Firm* — Flynn, Thiel, Boutell & Tanis, P.C.

(57) ABSTRACT

Clogging of membrane by slime adhesion is efficiently prevented and stable treatment can be carried out for a long period of time at a low cost by a small amount of chemicals without membrane deterioration and trihalomethane formation, even if applied to the water having a large number of viable cell counts and a harsh water quality by supplying water to be treated to a membrane separation apparatus 4, adding intermittently to the water to be treated a combined chlorine agent containing sulfamic compound, and repeating a non-addition feeding period in which water to be treated is supplied for 6-120 hours without addition of the combined chlorine agent, and an intermittent addition feeding period in which water to be treated is supplied for 0.5-40 hours under the addition of a combined chlorine agent at a biofilm exfoliating concentration in an early stage of biofilm formation during the non-addition feeding period.

4 Claims, 1 Drawing Sheet (51) Int. Cl.
*C02F 1/44* (2006.01)
*B01D 65/08* (2006.01)
*B01D 61/02* (2006.01)
*B01D 61/04* (2006.01)

(52) U.S. Cl.
CPC ..... *B01D 2311/12* (2013.01); *B01D 2321/162* (2013.01); *C02F 2209/29* (2013.01); *C02F 2209/44* (2013.01); *C02F 2303/20* (2013.01)

(56) References Cited

U.S. PATENT DOCUMENTS

2007/0034570 A1* 2/2007 DiMascio ..................... 210/636
2013/0026097 A1   1/2013 Hirao

FOREIGN PATENT DOCUMENTS

| JP | 2000-042544 | 2/2000 |
| JP | 2002-320968 | 11/2002 |
| JP | 2003-267811 | 9/2003 |
| JP | 2003-267811 A | 9/2003 |
| JP | 2006-263510 | 10/2006 |
| JP | 2008-012424 | 1/2008 |
| JP | 2010-201312 | 9/2010 |
| WO | WO 2011 125762 A1 | 10/2011 |

OTHER PUBLICATIONS

Form PCT/ISA/210 International Search Report with English language translation dated Oct. 2, 2012 (6 pages).
Form PCT/ISA/220 Notification of Transmittal of International Search Report dated Oct. 2, 2012 (2 pages).
Form PCT/ISA/237 Written Opinion of International Searching Authority dated Oct. 2, 2012 (3 pages).
Chinese Office Action dated Feb. 2, 2015, including partial English translation thereof (8 pages).
*Microorganism Science* 2., Growth • Proliferation • Inhibition of Proliferation, by T. Yanagida, Issued by Kabushikikaisha Gakkai Shuppan Center on Mar. 20, 1981, including partial English translation thereof (32 pages).
China Application No. 201280033137.6 Response dated May 29, 2015, with partial English translation (30 pgs.).
Japan Application No. 2013-523042 Decision dated Nov. 25, 2014, with partial English translation (6 pgs.).

* cited by examiner

METHOD OF MEMBRANE SEPARATION

TECHNICAL FIELD

The present invention relates to a method of membrane separation which is performed by supplying water to be treated to a membrane separation apparatus provided with a permeation membrane such as a reverse osmosis membrane (in the following sometimes called as "RO membrane"). More specifically, the present invention relates to a method of membrane separation wherein clogging of a membrane by slime is efficiently prevented and stable treatment can be carried out for a long period of time by adding intermittently a combined chlorine agent comprising a sulfamic compound to feed water supplied to a membrane separation apparatus.

TECHNICAL BACKGROUND

When membrane separation by a permeation membrane such as a RO membrane is carried out for water to be treated containing suspended solid and organic matter together with contaminant substances such as microorganism, the permeation membrane is contaminated by these substances wherein clogging of membrane by slime adhesion occurs to decrease flux and separation rate. In order to prevent the contamination of the membrane and to increase separation efficiency, there is adopted a slime adhesion prevention method wherein an oxidizing agent based on chlorine is added to feed water to be supplied to a membrane separation apparatus.

Patent document 1 (JP2006-263510A) teaches slime prevention treatment without degradation of the membrane and without formation of trihalomethane wherein a stable combined chlorine agent comprising chlorosulfamate formed from an oxidizing agent based on chlorine and a sulfamic compound is added to feed water to be supplied to a membrane separation apparatus. The sulfamic compound is exemplified by sulfamic acid or a salt thereof. The sulfamic acid is amidosulfuric acid represented by Formula [1] bellow wherein $R^1$, $R^2$ denotes each H or hydrocarbon group having carbon number of 1-6 independently. The oxidizing agent based on chlorine is exemplified by chlorine gas, chlorine dioxide, hypochlorous acid and salt thereof.

$$R^1R^2NSO_3H \qquad [1]$$

While patent document 1 suggests both continuous and intermittent additions of a sterilizing agent, continuous addition is adopted in Examples. Such continuous addition requires a large amount of chemicals causing high treatment costs. Further, even in case of continuous addition, low preventing effect of slime adhesion is obtained for the water having a large number of viable cell counts and having water quality of a harsh condition due to a high slime adhesion potential.

Patent document 2 (JP2010-201312A) teaches a method of membrane separation by adding a combined chlorine agent comprising a sulfamic compound to feed water supplied to a membrane separation apparatus wherein the additive amount of the combined chlorine agent is periodically or irregularly increased to 2-10 times of the ordinary amount for a period (T) and wherein the Z value represented by the following Formula [2] is 1.0<Z<2.0.

$$Z=(Mo \times T + Mx \times Tx)/(Mo \times T) \qquad [2]$$

(In Formula [2], Mo: Concentration of combined chlorine agent in feed water during ordinary concentration addition, T: Feeding period, Mx: Concentration of combined chlorine agent in feed water during 2-10 times concentration addition, Tx: Feeding period under concentration Mx.)

Although, in Patent document 2, during continuous addition of a combined chlorine agent comprising a sulfamic compound, a high concentration addition is performed periodically or irregularly, a low preventing effect of slime adhesion is obtained for the water having a large number of viable cell counts and having a water quality of a harsh condition due to a high slime adhesion potential. Considering the reason, if the proposed treatment is performed in the range of the increasing rate Z of 1.0<Z<2.0, the additive concentration during the high concentration addition period seems to be so important that the addition is carried out at a high concentration as possible whereby the ordinary concentration addition period of low effect becomes longer causing an increase of slime adhesion during the low effect period. On the other hand, if the low concentration period is set as short as possible, there comes out a problem that the effect by addition at a high concentration is almost lost because such a concentration in the high concentration period cannot be heightened. In Patent document 2, since a combined chlorine agent is added continuously, shock to microbes by intermittent changes in the concentration is small and the exfoliating effect to already adhered slime is presumably small.

Patent document 3 (JP2000-42544A) teaches a method of reverse osmosis membrane separation wherein a chlorine agent is added intermittently to the water to be treated under the condition that the residual chlorine concentration at the moment of addition to the water to be treated is in the range of 0.2-10 mg/L as a concentration level not forming trihalomethane, that the adding rate I represented by the following Formula [3] is in the range of 0.01-0.95, and that the residual chlorine concentration just before reverse osmosis membrane is in the range of 0.2-1 mg/L.

$$I=(T/1440) \times N \qquad [3]$$

(In Formula [3], T denotes the adding period of the chlorine agent (min), N is number of additions in 1 day.)

In Patent document 3, since a chlorine agent is added intermittently at a low concentration level not forming trihalomethane, a low preventing effect of slime adhesion is obtained for the water having a large number of viable cell counts and having a water quality of a harsh condition due to a high slime adhesion potential. If a chlorine agent is added at a high concentration in order to obtain an effect, there arises problems such as trihalomethane formation and deterioration of the membrane. Although, in Patent document 3, the chlorine concentration varies by the intermittent additions of sterilizer, the shock to microbes by intermittent changes is small and the exfoliating effect to already adhered slime is presumably small because a chlorine agent is added continuously to the water to be supplied to the membrane.

Patent document 4 (JP2003-267811A) teaches a method of exfoliating slime wherein slime is exfoliated by adding to a water system a slime exfoliating agent comprising an oxidizing agent based on chlorine and sulfamic acid and/or salt thereof. In Patent document 4, it is described that a slime control agent sterilizes or controls the multiplication of microbes by denaturation of the cell membrane, or by prohibition of the enzyme reaction of bacteria, while a slime exfoliating agent disperses agglomerates of microbes to exfoliate slimes from adhered surfaces mainly by lowering the adhesiveness of adhesive substances (usually polysaccharides) residing outside of microbes, and that the slime exfoliating agent of Patent document 4 has the ability to lower the adhesiveness of polysaccharides residing outside of microbes to reveal a slime exfoliating effect.

In Patent document 4, however, the method of exfoliating slime is applied only to the slime formed in ordinary water systems such as plant cooling water systems, paper—pulp water systems, waste treating water systems, iron—steel water systems and cutting oil water systems wherein there is no suggestion for application to the slime exfoliation of a permeation membrane such as a RO membrane. Further, in Patent document 4, slime exfoliation is performed after slime adhesion has occurred. This means that the slime exfoliation is intended to be carried out in a different process to the prevention of slime adhesion. Since, in permeation by a permeation membrane such as a RO membrane, water as a solvent permeates the membrane, microbes residing in the supplied water remains at the surfaces of the membrane to form a biofilm. If the biofilm grows into slime to adhere to the membrane surfaces, the exfoliation of the slime becomes to be difficult.

In Non-patent document 1 (Microorganism Science 2), it is described that the proliferation process of unicellular microorganisms includes 1) Lag phase wherein the cell count does not vary, 2) Acceleration phase wherein the cell count increases gradually, 3) Logarithmic phase wherein the cell count increases exponentially, 4) Retardation phase wherein the specific proliferation rate lowers, 5) Stationary phase wherein the increase and decrease of viable cell count come to a standstill, 6) Accelerating death phase wherein the viable cell count begins to decrease then, and 7) Logarithmic death phase wherein the viable cell count decreases exponentially. There is also described that, when chemical stress is given to microorganisms, the action of the chemicals becomes stronger, as the concentration of the chemicals becomes higher, in such order as 1) No effect, 2) Acceleration of proliferation, 3) Inhibition of proliferation, 4) Sterilization. There are further described that the proliferation rate decreases to zero at the inhibiting concentration for proliferation and that an increasing rate of cell number becomes negative at the sterilizing concentration whereby the cell numbers decrease or becomes extinct. It is also described that, with regard to extinction, there is a logarithm law of extinction wherein a linear relation is formed between duration and the logarithm of viable cell count.

PRIOR TECHNICAL DOCUMENT

Patent Document

Patent document 1 JP2006-263510A
Patent document 2 JP2010-201312A
Patent document 3 JP2000-42544A
Patent document 4 JP2003-267811A Non-Patent Document Non-patent document 1 Microorganism Science 2., Growth•Proliferation•Inhibition of Proliferation (Written by Tomomichi YANAGIDA, Issued by Kabusikikaisha Gakkai Shuppan Center on 20 Mar. 1981)

INTRODUCTION OF INVENTION

Subject to be Solved by Invention

An object of the present invention is to provide, in order to solve the above prior problem, a method of membrane separation wherein clogging of a membrane by slime adhesion is efficiently prevented and stable treatment can be carried out for a long period of time at a low cost by a small amount of chemicals without stopping of the membrane separation for slime exfoliation and without membrane deterioration and trihalomethane formation, even if applied to water having a large number of viable cell counts and having a water quality of a harsh condition due to a high slime adhesion potential.

Means to Solve Subject

The present invention includes the following methods of membrane separation;

(1) A method of membrane separation, comprising
supplying water to be treated to a membrane separation apparatus and
adding intermittently to the water to be treated a combined chlorine agent comprising a sulfamic compound,
wherein the viable cell count (log CFU/mL) of water to be treated is 3 or more,
the intermittent addition is performed by repeating a non-addition feeding period in which water to be treated is supplied without the addition of a combined chlorine agent, and an intermittent addition feeding period in which water to be treated is supplied under the addition of a combined chlorine agent at a biofilm exfoliating concentration in an early stage of biofilm formation during the non-addition feeding period,
the non-addition feeding period is for 6-120 hours,
the intermittent addition feeding period is for 0.5-40 hours, and
the concentration of the combined chlorine agent in the water to be treated in the intermittent addition feeding period is 0.5-20 mg/L as total chlorine.

(2) The method of membrane separation according to the above (1), wherein the additive amount of the combined chlorine agent added in the intermittent addition feeding period is the amount in which R represented by the following Formula [4] is 3 or more.

$$R = (\text{Intermittent addition feeding period } (h)) \times [1000 \times \text{Intermittent addition concentration (mg-Cl/L)}]^{2.5} / (\text{Non-addition feeding period } (h))^{3.0} \times 10^{\log CFU/mL} \quad (4)$$

(3) The method of membrane separation according to the above (1) or (2), wherein the early stage of the biofilm formation to start the intermittent addition feeding is before the logarithmic proliferation phase of microorganisms in the biofilm, and the biofilm exfoliating concentration is the concentration to inhibit a proliferation of microorganisms in the biofilm.

(4) The method of membrane separation according to any one of the above (1) to (3), wherein the membrane separation apparatus is provided with a reverse osmosis membrane.

(5) The method of membrane separation according to any one of the above (1) to (4), wherein the sulfamic acid to form the sulfamic compound of the combined chlorine agent is amidosulfuric acid represented by the following Formula [1].

[1]

(In Formula [1], $R^1$, $R^2$ denote each H or hydrocarbon group having carbon number of 1-6 independently.)

(6) The method of membrane separation according to any one of the above (1) to (5), wherein the combined chlorine agent is an aqueous agent comprising an alkali consisting of an alkali metal hydroxide, sulfamic compound, and oxidizing agent based on chlorine, wherein the composition ratio of the oxidizing agent based on chlorine to the sulfamic compound is in the range from 0.3 to 0.6 by Cl/N (mole ratio), the composition ratio of the oxidizing agent based on chlorine to alkali is in the range from 0.15 to 0.3 by Cl/alkali metal (mole ratio), and the free chlorine concentration in the aqueous agent is 2% by weight or lower of the total chlorine concentration.

The membrane separation apparatus according to the present invention is provided with a permeation membrane wherein water to be treated is supplied to the permeation membrane to carry out membrane separation. As the permeation membrane, all membranes to be used for membrane separation, such as a RO membrane, UF membrane (ultrafiltration membrane), and MF membrane (microfiltration membrane), may be used, while a membrane separation apparatus provided with a RO membrane is preferable for the present invention. For the material of the permeation membrane, the present invention is especially effective to a polymer membrane having a nitrogen-containing group, such as a polyamide (especially aromatic polyamide of a low tolerance to chlorine), polyurea, and polypiperazine amide, while other RO membranes based on such as cellulose acetate may be applicable. The permeation membrane may have a structure of a module such as a spiral type, hollow fiber type, tubular type, and flat membrane type.

As to the water to be treated for membrane separation by being supplied to the membrane separation apparatus, the present invention is applicable to all water possible to be separated by a permeation membrane, such as natural water, city water, industrial water, waste water, and treated water of waste water. The water to be treated may be water having a large number of viable cell counts and having a water quality of a harsh condition due to a high slime adhesion potential. The present invention is applied to water to be treated having a viable cell count (log CFU/mL) of 3 or more and a high slime adhesion potential whereby membrane separation can be performed under the prevention of slime adhesion.

In the present invention, the viable cell count (log CFU/mL) of water to be treated is measured by sampling, in a sterilized bottle, a sample of water to be treated which is supplied to the membrane separation apparatus, leaving the sample as it is at 30° C. for 7 days, incubating the sample on an agar medium at 30° C. for 7 days, then counting the number of formed colonies on the culture medium, and calculating the log value of the colony forming unit (CFU/mL). Here, "log" is used for common logarithm $\log_{10}$.

According to the present invention, such water to be treated is supplied to a membrane separation apparatus and a combined chlorine agent comprising a sulfamic compound is added intermittently to the water to be treated, whereby clogging of the permeation membrane by growth of a biofilm can be prevented efficiently and stable membrane separation can be carried out for a long period of time. Although the intermittent addition of a chlorine agent is known as shown in Patent documents 1 and 3 and, similarly, a combination of continuous and intermittent addition is also known, the clogging of a permeation membrane by the adhesion of a biofilm cannot be prevented by the simple application of intermittent addition as above. In membrane separation using a permeation membrane such as a RO membrane, water as solvent permeates the membrane, while the solute is concentrated at the surfaces of the membrane where remaining microbes proliferate to form a biofilm. If, by continuing the membrane separation in such a condition, the microbes further proliferate and the biofilm grow into a slime to adhere to the membrane surfaces, flux decreases by clogging of the membrane and exfoliation of the slime becomes difficult.

In an early stage of biofilm formation before the logarithmic proliferation phase, especially in the acceleration phase, the adhesiveness of the cells is so low that the biofilm can be exfoliated easily. On the other hand, in a latter stage of biofilm formation, especially after the logarithmic proliferation phase, the adhesiveness of the cells is so high that slime presumably adheres to the membrane to form clogging. According to the present invention, the water to be treated is supplied under the intermittent addition of a combined chlorine agent at a biofilm exfoliating concentration during a period when the cell adhesiveness is low at an early stage of the biofilm formation in the non-addition feeding period, namely before the logarithmic proliferation phase, especially in the acceleration phase, whereby the biofilm can be exfoliated and clogging of the membrane by the growth of the biofilm can be prevented. On the other hand, when the water to be treated is supplied under the intermittent addition of a combined chlorine agent in a latter stage of biofilm formation, especially after the logarithmic proliferation phase, it is difficult to exfoliate slime having a higher adhesiveness by growth of the biofilm and the clogging of a membrane cannot be prevented. A similar result is supposed to be applicable to the case wherein continuous addition and intermittent addition are combined.

Non-patent document 1 reveals that the proliferation rate can be forecasted computationally in the logarithmic proliferation phase, namely the logarithmic phase wherein the cell count increases exponentially, that the proliferation rate decreases at an inhibiting concentration, and that an increasing rate of the cell count becomes 0 or negative at the sterilizing concentration whereby the cell count decreases or becomes extinct. Accordingly, by stopping the non-addition feeding period at an early stage of the biofilm formation during the non-addition feeding period, namely before the logarithmic proliferation phase, especially in the acceleration phase, and then by supplying water to be treated under the addition of a combined chlorine agent at a biofilm exfoliating concentration, a biofilm can be exfoliated before the biofilm grows to adhere to the membrane. Here, by calculating the amount of cells proliferated in the biofilm until stopping of the non-addition feeding period and by supplying the water to be treated under the addition of a combined chlorine agent at the amount to inhibit the proliferation of the cells in the biofilm, especially at the amount to decrease the proliferation rate to 0 or negative, a biofilm already proliferated can be exfoliated efficiently. By performing the water supply under intermittent addition repeating the non-addition feeding period and intermittent addition feeding period, the biofilm can be exfoliated in a low adhesive condition of the cells so that the slime adhesion and clogging of the membrane are prevented.

In the present invention, a combined chlorine agent added to the water to be treated is a combined chlorine agent comprising a sulfamic compound. According to the present invention, free chlorine concentration, combined chlorine concentration, and total chlorine concentration are measured as $Cl_2$ concentration by the DPD method using N,N-diethyl-1,4-phenylenediamine according to JIS K 0400-33-10:1999, which gives the following definitions. Namely, free chlorine is ruled as chlorine residing in the forms of hypochlorous acid, hypochlorite ion or dissolved chlorine. Combined chlorine is also ruled as chlorine residing in the forms of chloramine or organic chloramine which is included in total chlorine measured by the DPD method but not included in the free chlorine. Total chlorine is ruled as chlorine in the forms of free chlorine and/or combined chlorine.

A combined chlorine agent is an agent measured as the above combined chlorine which is preferably an aqueous agent comprising an alkali consisting of an alkali metal hydroxide, sulfamic compound, and oxidizing agent based on chlorine. A combined chlorine agent used in the present invention is exemplified in WO 2011/125762, a former application by the present applicant. Especially, a preferable agent is the one wherein the composition ratio of the oxidizing agent based on chlorine to the sulfamic compound is in the range from 0.3 to 0.6, preferably 0.4-0.5 by Cl/N (mole ratio), the composition ratio of the oxidizing agent based on chlorine to alkali is in the range from 0.15 to 0.3, preferably 0.2-0.25 by Cl/alkali metal (mole ratio), and the free chlorine concentration in the aqueous agent is 2% by weight or lower of a total chlorine concentration. The aqueous solution agent is preferably of pH 13 or more and the composition ratio of sulfamic compound to alkali in the aqueous solution agent is in the range from 0.4 to 0.6 by N/alkali metal (mole ratio). The above Cl/N (mole ratio) corresponds to the ratio of $Cl_2$ mole number of the oxidizing agent measured according to JIS K 0400-33-10:1999 to mole number of sulfamic compound composed of N. The above N/alkali metal (mole ratio) corresponds to the ratio of the above mole number of the sulfamic compound to the mole number of the alkali metal formed by the alkali metal hydroxide.

The sulfamic acid to form the sulfamic compound of the combined chlorine agent is an amidosulfuric acid represented by the following Formula [1].

$$R^1R^2NSO_3H \quad [1]$$

(In Formula [1], $R^1$, $R^2$ each denote H or a hydrocarbon group having a carbon number of 1-6 independently.)

A preferable sulfamic acid is the one in narrow sense in which $R^1$, $R^2$ each denote H, while N-methyl sulfamic acid, N,N-dimethyl sulfamic acid, N-phenyl sulfamic acid, and so on may be used. The sulfamic compound may be a sulfamic acid in a powder of a free acid or a sulfamate such as an alkali metal salt including a sodium salt and a potassium salt.

The alkali for composing a combined chlorine agent consists of an alkali metal hydroxide such as sodium hydroxide and potassium hydroxide. An oxidizing agent based on chlorine includes hypochlorous acid, chlorous acid and a water-soluble salt thereof such as an alkali metal salt thereof. These preferably have no content of sodium chloride. By controlling the sodium chloride content in the aqueous agent at 50,000 mg/L or lower, the precipitation of salt is prevented and stability of an oxidizing agent based on chlorine increases.

The combined chlorine agent is produced by such a process wherein a sulfamic compound is added to an aqueous solution of an alkali consisting of an alkali metal hydroxide to dissolve, and then an oxidizing agent based on chlorine is added to and mixed with the obtained aqueous mixture solution of the sulfamic compound and alkali to form an aqueous solution agent. The aqueous alkali solution preferably contains 50-65% by weight of water. The alkali consists of an alkali metal hydroxide such as sodium hydroxide and potassium hydroxide which maintains its solubility when the aqueous solution of the combined chlorine agent has formed.

The sulfamic compound may be added in the form of a sulfamate. Usable sulfamates include sodium sulfamate, potassium sulfamate, and ammonium sulfamate, which are soluble when the aqueous solution of the combined chlorine agent has formed. This sulfamic compound is added in order that the sulfamic compound concentration in the aqueous solution agent becomes to be the above concentration. The amount of sulfamic compound to be added is preferably the amount wherein the composition ratio of sulfamic compound to alkali is in the range from 0.4 to 0.6 by N/alkali metal (mole ratio). The sulfamic compound is added in a form of powder or aqueous solution of sulfamic acid or sulfamate. When using a sulfamate, the amount of alkali metal contained in the sulfamate is calculated as alkali metal in Cl/alkali metal or N/alkali metal. When using an aqueous solution, the amount of water contained in the aqueous solution is calculated as water in the aqueous alkali solution.

An oxidizing agent based on chlorine is preferably a hypochlorous acid or hypochlorite which is preferably added as an aqueous solution having an available chlorine ($Cl_2$) concentration of 5-20% by weight, preferably 10-15% by weight. The additive amount of oxidizing agent based on chlorine is decided in order that the available chlorine ($Cl_2$) concentration in the aqueous solution agent becomes the above concentration, and that the composition ratio of oxidizing agent based on chlorine to sulfamic compound by Cl/N (mole ratio) becomes the above ratio, whereby a combined chlorine agent of an aqueous solution agent superior in reactivity, stability, handling and scentlessness of chlorine is produced efficiently without foaming and emitting a chlorine odor. Here, an oxidizing agent based on chlorine is preferably added and mixed gradually. When the oxidizing agent based on chlorine is a salt of an alkali metal, the amount of the alkali metal is calculated as alkali metal in Cl/alkali metal or N/alkali metal.

The above combined chlorine agent is used by being added to water to be treated for chlorine treatment. The agent has a low free chlorine concentration and high combined chlorine concentration, so that the combined chlorine concentration of the water system to which the agent has been added can be heightened even when added at a low free chlorine concentration. Since the combined chlorine has a higher permeability into a biofilm than free chlorine, the effects to lower the stickiness of sticky substance from inside and to exfoliate the biofilm can be obtained. In order to perform chlorine treatment, a combined chlorine agent can be added, at a free chlorine concentration of 0.3 mg/L or lower, preferably 0.1 mg/L or lower, to the water to be treated which is supplied to a membrane separation apparatus. In this case, the total chlorine concentration may be 0.5-20 mg/L.

Even when the combined chlorine agent is added to the water to be treated at a low free chlorine concentration as a slime control agent for a permeation membrane such as a RO membrane, the combined chlorine concentration can be so high that the available chlorine concentration becomes high and clogging of the membrane by slime adhesion can be prevented, even when the treatment applied is to water having a large number of viable cell counts and a water quality of harsh condition due to a high slime adhesion potential. In Patent document 3, since a chlorine agent is added intermittently at a low concentration level not forming trihalomethane, the preventing effect of slime adhesion cannot be obtained for water having a large number of viable cell counts and a water quality of harsh condition due to the high slime adhesion potential. On the other hand, since the above combined chlorine agent can be added at a high combined chlorine concentration, slime adhesion can be prevented for the water to be treated having a large number of viable cell counts.

The effect of preventing slime adhesion may be small when the combined chlorine agent is added continuously, as in Patent document 1, to water having a large number of viable cell counts and a water quality of harsh condition due to a high slime adhesion potential, while a biofilm can be exfoliated efficiently to obtain an effect of preventing slime adhesion by a small additive amount when a combined chlorine agent is added intermittently according to the condition of the present invention. Since, in the case of continuous addition, treatment under similar conditions is carried out, the already adhered slime grows without being exfoliated. Since, however, in the case of repeating a non-addition feeding period and intermittent addition feeding period, microorganisms in the already formed biofilm receive shocks, the biofilm is exfoliated whereby slime tends not to adhere as a whole. Although, in Patent document 2, the slime receives shocks by heightening the concentration intermittently, the slime layer becomes thick because a low concentration period continues for as long a period of time as 30 days whereby the slime cannot be exfoliated.

In the present invention, the biofilm can be exfoliated in a non-adhesive condition, by shortening the non-addition feeding period wherein no combined chlorine agent is added, and by intermittent addition feeding wherein a combined chlorine agent is added in a biofilm exfoliating concentration in which the proliferation rate of the microorganisms is 0 or negative, at an early stage of biofilm formation, namely before the logarithmic proliferation phase of the microorganisms in the biofilm, especially in the acceleration phase. By this, the slime adhesion can be prevented efficiently using a small amount of chemicals for the water to be treated having a large number of viable cell counts. In order to carry out intermittent addition feeding at an early stage of biofilm formation according to the present invention, a non-addition feeding period adding no combined chlorine agent is performed for 6-120 hours, preferably 18-48 hours. Further, in order to control the combined chlorine concentration during the intermittent addition feeding period to an effective concentration wherein the proliferation rate is 0 or negative, the total chlorine concentration during the intermittent addition feeding period is controlled to 0.5-20 mg/L, preferably 0.8-16 mg/L, and the duration of the adding period to 0.5-40 hours, preferably 1-40 hours.

According to the present invention, the additive amount of the combined chlorine agent to be added in the intermittent addition feeding period is the amount in which R represented by the following Formula (4) is 3 or more, preferably 5 or more, whereby a biofilm formed in non-addition feeding period is exfoliated.

$$R = (\text{Intermittent addition feeding period } (h) \times [1000 \times \text{Intermittent addition concentration (mg-Cl/L)}]^{2.5}) / (\text{Non-addition feeding period } (h)^{3.0} \times 10^{\log CFU/mL}) \quad (4)$$

(In Formula (4), the intermittent addition feeding period is indicated by hour (h), intermittent addition concentration is indicated by total chlorine concentration (mg/L) when combined chlorine agent is added to water to be treated, non-addition feeding period is indicated by hour (h), log CFU/mL is an exponential number with the viable cell count in the water to be treated.)

The above intermittent addition concentration is indicated by "mg-Cl/L". The exponential number with viable cell count indicated by "log CFU/mL" is given as a number corresponding to "n" when the viable cell count is shown as "$A \times 10^n/mL$" wherein log is used for $\log_{10}$.

The numerator of Formula (4) is the product of "Intermittent addition feeding period (h)" and "Intermittent addition concentration (mg-Cl/L)" which denotes the additive amount of combined chlorine agent during the intermittent addition feeding period. The denominator of Formula (4) is the product of "Non-addition feeding period (h)" and "viable cell count indicated by (log CFU/mL)" which denotes the proliferation amount of cells proliferated during the non-addition feeding period. Accordingly, R of Formula (4) is represented by (Additive amount of combined chlorine agent during the intermittent addition feeding period)/(proliferation amount during the non-addition feeding period), which denotes the total amount of combined chlorine agent added during the intermittent addition feeding period to total amount of cells proliferated during the non-addition feeding period.

Formula (4) has been developed from Non-patent document 1. Explaining the proliferation during the non-addition feeding period for the denominator of R, the following Formula (VI.5) is described, on page 243 of Non-patent document 1, relating to the proliferation of unicellular microorganisms in the logarithmic phase.

$$\ln N = \ln N_0 + \mu t \quad (VI.5)$$

(t: Time, $N_0$: Cell number at t=0, N: Cell number at t, $\mu$: Specific proliferation rate, ln: natural logarithm $\log_e$.)

Formula (VI.5) is a formula relating to proliferation in the logarithmic phase. In order to adapt to the acceleration phase preceding the logarithmic phase, the following Formula (VI.5A) has been developed by deciding the exponential number of t as (m=3) according to Fig. VI.2 on page 242 of Non-patent document 1.

$$\ln N = \ln N_0 + \mu t^m \quad (m=3) \quad (VI.5A)$$

Relating to the specific proliferation rate p, the following Formula (VI.7) is described on page 244 of Non-patent document 1.

$$\mu_m \times S/(K_s + S) \quad (VI.7)$$

($\mu_m$: Maximum specific proliferation rate, S: Concentration of substrate, $K_s$: Specific proliferation rate at (1/2) $\mu_m$.)

In Formula (VI.7), "(Concentration of substrate S)=(Viable cell count)" is assumed because p is proportional to the concentration of substrate S when the concentration of substrate S is small, and the concentration of substrate S is presumed to be high when the viable cell count is large. For example, the concentration of substrate S is $10^4$ when the viable cell count (log CFU/mL)=4. In this manner, the formula of "proliferation amount of cells proliferated during the non-addition feeding period" in the denominator of Formula (4) is conducted from Formulas (VI.5A) and (VI.7). This formula reveals the proliferation amount of cells before the logarithmic proliferation phase, especially in the acceleration phase of the proliferation of the biofilm-forming microorganisms during the non-addition feeding period.

The additive amount of the combined chlorine agent during the intermittent addition feeding period represented by the numerator of Formula (4) is conducted as follows. Namely, the following Formula (VII.5A) is conducted by transforming Formula (VII.5) below regarding the reaction to chemical stress which is described on page 411 of Non-patent document 1.

$$(1/t) \times \ln(N_0/N) = K \times C^n \quad (VII.5)$$

$$\ln N = \ln N_0 - t \times K \times C^n \quad (VII.5A)$$

(K: Constant of proportion, C: Concentration of chemicals, n: Exponential number to sterilizing concentration.)

Since the Exponential number to sterilizing concentration varies with chemicals as about 1 for hypochlorous acid and 4-6 for phenol, the number in Formula (VII.5) is set as n=2.5 to meet the Examples. By such manner, the formula of the additive amount of the combined chlorine agent during the intermittent addition feeding period represented by the numerator of Formula (4) has been conducted. While the formula reveals the sterilizing concentration because "n" represents "Exponential number to sterilizing concentration", the formula can be recognized as the concentration of chemicals to exercise a chemical effect over the viable cells because Formula (VII.5) regards the reaction to chemical stress. In the present invention, Formula (VII.5A) reveals the exfoliation concentration of the biofilm by the permeation of chemicals because the combined chlorine agent has high permeability.

In the methods of membrane separation according to the present invention, membrane separation by supplying water to be treated to a membrane separation apparatus is performed, as explained before, by repeating an intermittent addition feeding period and a non-addition feeding period, wherein, in the intermittent addition feeding period, the water to be treated is supplied for 0.5-40 hours under the addition of a combined chlorine agent comprising a sulfamic compound at the total chlorine concentration of 0.5-20 mg/L, and, in the non-addition feeding period, the water to be treated is supplied for 6-120 hours without the addition of the combined chlorine agent. By adding the combined chlorine agent during the intermittent addition feeding period at the amount in which R represented by the above Formula (4) is 3 or more, preferably 5 or more, a low adhesive biofilm which has grown in the non-addition feeding period can be exfoliated efficiently by a small amount of chemicals whereby slime trouble can be prevented.

In the present invention, the non-addition feeding period which does not add the combined chlorine agent becomes short, by stopping the non-addition feeding period at an early stage of biofilm formation before the logarithmic proliferation phase, especially in the acceleration phase, and the intermittent addition feeding period restarts in a condition wherein the adhesiveness of the proliferated cells is low and the biofilm exfoliates easily. Further, by supplying to a permeation membrane in the intermittent addition feeding period, the water to be treated having a combined chlorine concentration of a biofilm exfoliating concentration wherein the proliferation rate is 0 or negative, the biofilm can be exfoliated and the growth of the biofilm can be prevented, whereby slime trouble can be prevented efficiently by a small amount of chemicals even if applied to the water having a large number of viable cell counts.

Since, in the present invention, by using the above combined chlorine agent, the free chlorine concentration in water to be treated can be low even if the combined chlorine concentration is heightened, slime adhesion is prevented and the stable treatment of membrane separation can be continued without membrane deterioration and trihalomethane formation. Since the combined chlorine agent is easily permeable to a biofilm and exfoliative, biofilm exfoliation can be performed while continuing membrane separation in an early stage of biofilm formation. Accordingly, it is not necessary to stop membrane separation for slime exfoliation.

Although the combined chlorine agent comprising a sulfamic compound used in the present invention is exfoliative to slime, the exfoliative effect decreases remarkably when the biofilm forming period of slime is long to form thick layers. Accordingly, it is important to set the concentration of the combined chlorine agent according to the biofilm forming period (non-addition period) as above. Here, the exfoliation of the biofilm formed in one day is most efficient.

Effect of Invention

According to the present invention, membrane separation is performed by supplying to a membrane separation apparatus water to be treated having a viable cell count (log CFU/mL) of 3 or more, and adding intermittently to the water to be treated a combined chlorine agent comprising a sulfamic compound, wherein the intermittent addition of a combined chlorine agent to exfoliate the biofilm are repeated at an early stage of biofilm formation in the non-addition feeding period, and wherein the non-addition feeding period which adds no combined chlorine agent is performed for 6-120 hours, the intermittent addition feeding period is performed for 0.5-40 hours, and the concentration of the combined chlorine agent during the intermittent addition feeding period is 0.5-20 mg/L as the total chlorine concentration, whereby the clogging of a membrane by slime adhesion is efficiently prevented and stable treatment can be carried out for a long period of time at a low cost by a small amount of chemicals without stopping of the membrane separation for slime exfoliation and without the membrane deterioration and trihalomethane formation, even if applied to water having a large number of viable cell counts and a water quality of harsh condition due to high slime adhesion potential.

MEANS OF PUTTING THE INVENTION INTO PRACTICE

Embodiment of Invention

Figure 1:
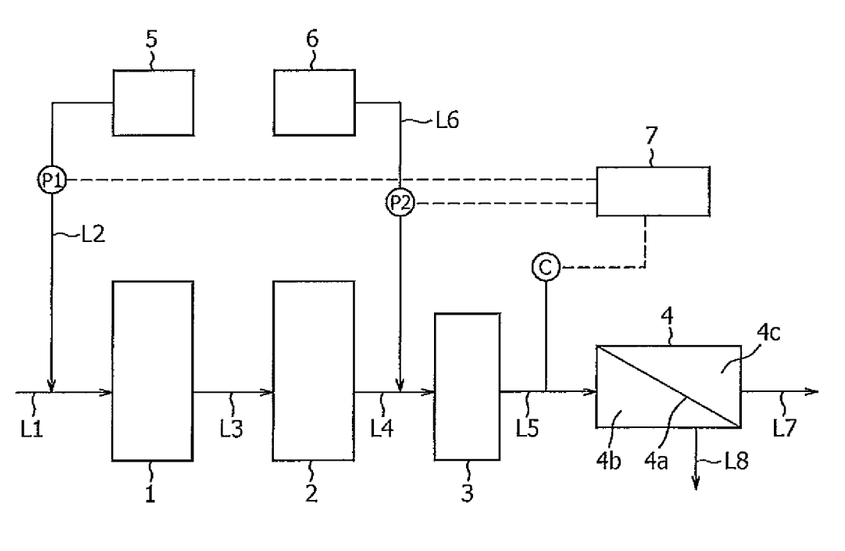
FIG. 1 is a flow diagram showing a method of membrane separation according to an embodiment of the present invention.

Below, an embodiment of the present invention is explained by a drawing. FIG. 1 is a flow diagram showing a method of membrane separation according to an embodiment of the present invention wherein numeral 1 denotes a filter, 2 an active carbon treatment apparatus, 3 a security filter, 4 a RO membrane separation apparatus, 5 a combined chlorine agent tank, 6 a reducing agent tank, and 7 a control apparatus. Filter 1 is structured to filter through a filter medium layer such as sand and anthracite to remove SS, colloid, and so on. Active carbon treatment apparatus 2 is composed to pass water through an active carbon layer to remove organic matter, coloring substance, and so on. RO membrane separation apparatus 4 is structured to be divided into a concentrate chamber 4b and a permeate chamber 4c by a RO membrane module 4a to perform RO membrane separation. Control apparatus 7 is structured to repeat, by a timing program, an intermittent addition feeding period wherein pump P1 is started, and a non-addition feeding period wherein pump P1 is stopped. Here, control apparatus 7 is structured to control the additive amount of the combined chlorine agent by changing the revolution rate of pump P1. Control apparatus 7 is also configured to control pump P2 by a free chlorine detection signal of detector C.

Membrane separation by the above apparatus is carried out as follows. During the non-addition feeding period, pump P1 is stopped by a command from control apparatus 7. Water to be treated from raw water line L1 is supplied, without addition of the combined chlorine agent from combined chlorine agent tank 5 via line L2, to filter 1 to filtrate, then to active carbon treatment apparatus 2 via line L3 to perform active carbon treatment, then to security filter 3 via line L4, and then to RO membrane separation apparatus 4 via line L5 to perform RO membrane separation.

The intermittent addition feeding period starts at an early stage of biofilm formation in the non-addition feeding period, namely before the logarithmic proliferation phase, wherein pump P1 is started by a command from control apparatus 7 to add a combined chlorine agent from combined chlorine agent tank 5 to the water to be supplied via line L2, and wherein the revolution rate of pump P1 is controlled so that R represented by Formula (4) is at a designated value. By this, microorganisms in the water to be treated are sterilized. Then the water to be treated is subjected to filtration by filter 1, to active carbon treatment by active carbon treatment apparatus 2 via line L3, and, after passing security filter 3 via line L4, to RO membrane separation by RO membrane separation apparatus 4 via line L5, wherein microorganisms residing in and around the devices are also sterilized.

During these processes, detector C installed in line L5 detects the free chlorine concentration of the water to be treated at the exit of security filter 3. The detection signal is sent to control apparatus 7 which receives the free chlorine detection signal and controls pump P1 so that the free chlorine concentration is 0.3 mg/L or lower. When the free chlorine concentration exceeds 0.3 mg/L even if the additive amount of the sulfamic compound is adjusted by controlling pump P1, control apparatus 7 controls pump P2, by the free chlorine detection signal of detector C, to add sodium bisulfite from reducing agent tank 6 via line L6. Active carbon treatment apparatus 2, reducing agent tank 6 and pump P2 may be omitted in some cases.

After addition of the combined chlorine agent has been continued for a designated period, pump P1 is stopped by a command from control apparatus 7 to repeat the water supply of the non-addition feeding period wherein RO membrane separation is carried out by continuing the supply of water to be treated without the addition of the combined chlorine agent from the combined chlorine agent tank 5. Since, by transferring to a new non-addition feeding period, microorganism proliferation restarts in a new environment, a new logarithmic proliferation phase of the microorganism restarts. Before the new logarithmic proliferation phase restarts, pump P1 is started by a command from control apparatus 7 to transfer to a new intermittent addition feeding period wherein the biofilm formed during the preceding non-addition feeding period is exfoliated under a low adhesive condition from the devices, especially RO membrane module 4a, whereby membrane clogging by biofilm growth can be prevented.

EXAMPLES

The following is an explanation of the Examples and Comparative Examples wherein % denotes "% by weight" unless specific indication is given. Viable cell count (log CFU/mL) was measured by the following method. Namely, 50 mL of the supplied water to RO membrane separation apparatus 4 was sampled in a 100 mL sterilized bottle from the exit of security filter 3 and left as it was at 30° C. for 7 days. Then 100 μL of the sample was spread on an agar medium and incubated at 30° C. for 7 days. Then the number of formed colonies on the culture medium was counted to calculate viable cell count (log CFU/mL). The used agar medium was the most colony-forming culture medium selected from several different agar media.

Examples 1-13, Comparative Examples 1-3

Slime prevention treatment was carried out by supplying waste-treated water, as feed water, to a RO membrane separation test apparatus for one month, and by adding, under the condition given in Table 1, intermittently to the feed water, a combined chlorine agent comprising a sulfamic compound which consists of an aqueous agent of pH 13 comprising a 2% (as available chlorine ($Cl_2$) concentration) of sodium hypochlorite, 8% of sulfamic acid, and 1% of sodium hydroxide. For the RO membrane, TW-30 (PA membrane), a product of The Dow Chemical Company was used. The experimental results obtained are given in Table 1.

In Table 1, the effect of each Example was evaluated by flux maintaining rate for one month of water feeding, namely, the rate of the final flux to the first flux, wherein 95-100% (final flux/first flux) was graded as ◯, 90-94% as Δ, and –89% as X. "Viable cell count" in Table 1 denotes the log value of viable cell count in 1 mL of water to be treated (CFU/mL). "Concentration" denotes total chlorine concentration (mg-Cl/L) of water to be treated which is added by the combined chlorine agent. "Adding rate I" is a number according to Formula (3) of Patent document 3 which was calculated for each Example. "Average concentration" is the average concentration of the oxidizing agent added in a unit period which is described as an index of treatment cost.

Table 1

TABLE 1

| | Viable cell count (log CFU/mL) | Non-addition feeding | | Intermittent addition feeding | | In-creasing rate Z | Adding rate I | Average concen-tration (mg/L) | Effect | Additive amount of agent (numerator of R) | Proliferation amount of cell (denominator of R) | R |
|---|---|---|---|---|---|---|---|---|---|---|---|---|
| | | Period (h) | Concen-tration (mg-Cl/L) | Period (h) | Concen-tration (mg-Cl/L) | | | | | | | |
| Comparative Example 1 | 3 | 21.0 | 0 | 3.0 | 0.4 | — | 0.13 | 0.0 | X | 8.7E+06 | 9.3E+06 | 1 |
| Example 1 | 3 | 21.0 | 0 | 3.0 | 0.6 | — | 0.13 | 0.1 | Δ | 2.8E+07 | 9.3E+06 | 3 |
| Example 2 | 3 | 21.0 | 0 | 3.0 | 0.8 | — | 0.13 | 0.1 | ◯ | 4.9E+07 | 9.3E+06 | 5 |
| Example 3 | 3 | 21.0 | 0 | 3.0 | 1.5 | — | 0.13 | 0.2 | ◯ | 2.8E+08 | 9.3E+06 | 30 |
| Example 4 | 3 | 23.0 | 0 | 1.0 | 1.5 | — | 0.04 | 0.1 | ◯ | 9.3E+07 | 1.2E+07 | 8 |
| Example 5 | 3 | 23.5 | 0 | 0.5 | 1.5 | — | 0.02 | 0.0 | Δ | 4.7E+07 | 1.3E+07 | 4 |
| Comparative Example 2 | 3 | 23.9 | 0 | 0.1 | 1.5 | — | 0.00 | 0.0 | X | 9.3E+06 | 1.4E+07 | 1 |
| Example 6 | 4 | 21.6 | 0 | 2.4 | 15.4 | — | 0.10 | 1.5 | ◯ | 7.1E+10 | 1.0E+08 | 701 |

TABLE 1-continued

|  | Viable cell count (log CFU/mL) | Non-addition feeding Period (h) | Non-addition feeding Concentration (mg-Cl/L) | Intermittent addition feeding Period (h) | Intermittent addition feeding Concentration (mg-Cl/L) | Increasing rate Z | Adding rate I | Average concentration (mg/L) | Effect | Additive amount of agent (numerator of R) | Proliferation amount of cell (denominator of R) | R |
|---|---|---|---|---|---|---|---|---|---|---|---|---|
| Example 7 | 4 | 19.2 | 0 | 4.8 | 7.7 | — | 0.20 | 1.5 | O | 2.5E+10 | 7.1E+07 | 353 |
| Example 8 | 4 | 18.0 | 0 | 6.0 | 6.2 | — | 0.25 | 1.5 | O | 1.8E+10 | 5.8E+07 | 306 |
| Example 9 | 4 | 22.5 | 0 | 1.5 | 3.1 | — | 0.06 | 0.2 | O | 7.9E+08 | 1.1E+08 | 7 |
| Example 10 | 4 | 22.5 | 0 | 1.5 | 2.3 | — | 0.06 | 0.1 | Δ | 3.8E+08 | 1.1E+08 | 3 |
| Example 11 | 4 | 6.0 | 0 | 6.0 | 6.2 | — | 0.25 | 3.1 | O | 1.8E+10 | 2.2E+06 | 8273 |
| Example 12 | 4 | 48.0 | 0 | 16.0 | 6.2 | — | — | 1.5 | O | 4.8E+10 | 1.1E+09 | 43 |
| Example 13 | 4 | 120.0 | 0 | 40.0 | 6.2 | — | — | 1.5 | O | 1.2E+11 | 1.7E+10 | 7 |
| Comparative Example 3 | 4 | 240.0 | 0 | 80.0 | 6.2 | — | — | 1.5 | X | 2.4E+11 | 1.4E+11 | 2 |

In Table 1, inferior results were obtained for examples beyond the present invention such as Comparative Example 1 wherein the additive concentration during the intermittent addition feeding period was low and R is 1, Comparative Example 2 wherein the intermittent addition feeding period was short and R was 1, and Comparative Example 3 wherein the intermittent addition feeding period was long and R was 2. Although Comparative Example 1 adopts an adding rate I of 0.01-0.95, which was rated as a suitable rate according to Patent document 3, no effect was obtained in the case that viable cell count (log CFU/mL) was 3 or more.

On the other hand, Example 1-3 showed that a good effect of treatment was obtained at a low cost (low average concentration) in the case of an intermittent additive concentration at 0.6 mg-Cl/L or higher. Example 4-5 showed that duration of the intermittent addition feeding period was suitable to be 0.5 h or more. Example 6-10 showed that an additive concentration over 10 mg-Cl/L was disadvantageous in cost, despite that there was no upper limit of additive concentration for prevention effect. From Example 11-13, the duration of the non-addition feeding period was favorable to be 6 h-120 h, because in the case that the non-addition feeding period was short, the average concentration became higher causing a disadvantage in cost, and in the case that the non-addition feeding period exceeded 120 h, no effect was obtained which required a high concentration addition causing deterioration of permeate and increase in salt concentration with added chemicals.

Comparative Examples 4-14

The procedures as in Examples 1-11 and Comparative Examples 1-3 were pursued except that the combined chlorine agent was added as in Example 1 of Patent document 2 wherein ordinary addition for 29 days and high concentration addition for one day were performed by varying additive concentration. The experimental results were shown in Table 2 wherein "Increasing rate Z" denotes value calculated according to Formula (2) of Patent document 2. Other items in Table 2 were the same as Table 1.

Table 2

TABLE 2

|  | Viable cell count (logCFU/mL) | Ordinary concentration addition Period (d) | Ordinary concentration addition Concentration (mg-Cl/L) | High concentration addition Period (d) | High concentration addition Concentration (mg-Cl/L) | Increasing rate Z | Adding rate I | Average concentration (mg/L) | Effect | R |
|---|---|---|---|---|---|---|---|---|---|---|
| Comparative Example 4 | 2 | 29 | 3.9 | 1 | 15 | 1.13 | — | 4.2 | O | — |
| Comparative Example 5 | 2 | 29 | 1.5 | 1 | 15 | 1.33 | — | 2.0 | O | — |
| Comparative Example 6 | 2 | 29 | 0.8 | 1 | 15 | 1.67 | — | 1.3 | O | — |
| Comparative Example 7 | 2 | 29 | 0.4 | 1 | 12 | 2.00 | — | 0.8 | O | — |
| Comparative Example 8 | 3 | 29 | 3.9 | 1 | 15 | 1.13 | — | 4.2 | O | — |
| Comparative Example 9 | 3 | 29 | 1.5 | 1 | 15 | 1.33 | — | 2.0 | O | — |
| Comparative Example 10 | 3 | 29 | 0.8 | 1 | 15 | 1.67 | — | 1.3 | O | — |
| Comparative Example 11 | 3 | 29 | 0.4 | 1 | 12 | 2.00 | — | 0.8 | X | — |
| Comparative Example 12 | 4 | 29 | 3.9 | 1 | 15 | 1.13 | — | 4.2 | O | — |
| Comparative Example 13 | 4 | 29 | 1.5 | 1 | 15 | 1.33 | — | 2.0 | X | — |
| Comparative Example 14 | 4 | 29 | 0.8 | 1 | 15 | 1.67 | — | 1.3 | X | — |

In Table 2, it is understood that the additive manner of Patent document 2 is effective in the case that the water to be treated has a low (=2) viable cell count (log CFU/mL) corresponding to slime adhesion potential as shown in Comparative Examples 4-7, but is ineffective in the case that water to be treated has high viable cell count (log CFU/mL) as shown in Comparative Examples 8-14.

METHOD OF INDUSTRIAL APPLICATION OF THE INVENTION

The present invention can be applied to a method of membrane separation which is performed by supplying water to be treated to a membrane separation apparatus provided with a permeation membrane such as a reverse osmosis membrane, especially, to a method of membrane separation wherein clogging of the membrane by slime is efficiently prevented and stable treatment can be carried out for a long period of time by adding intermittently an oxidizing agent based on a combined chlorine comprising a sulfamic compound to feed water supplied to a membrane separation apparatus.

EXPLANATION OF NUMERAL

1: Filter, 2: Active carbon treatment apparatus, 3: Security filter, 4: RO membrane separation apparatus, 4a: RO membrane module, 4b: Concentrate chamber, 4c:Permeate chamber, 5: Combined chlorine agent tank, 6: Reducing agent tank, 7: Control apparatus, C: Detector, L1: Raw water line, L2-L8: Line, P1-P2: Pump.

The invention claimed is:

1. A method of membrane separation, comprising the successive steps of:
supplying a water to be treated to a membrane separation apparatus having a membrane for a non-addition period in which a combined chlorine treating agent is not added and
supplying a water to be treated to the membrane separation apparatus for an intermittent addition feeding period in which a combined chlorine treating agent is added, wherein
the combined chlorine treating agent is an aqueous agent containing an alkali metal hydroxide, a sulfamic acid compound, and a chlorine-based oxidizing agent,
a viable cell count, log CFU/mL, of the water to be treated is 3 or more,
the non-addition feeding period is for 6-120 hours and the intermittent addition feeding period commences during the formation of a biofilm on the membrane and is for 0.5-40 hours,
the concentration of the combined chlorine treating agent in the water to be treated in the intermittent addition feeding period is 0.5-20 mg/L as total chlorine for exfoliating the biofilm formed on the membrane while the biofilm is in a non-adhesive condition, and
the combined chlorine treating agent is added during the intermittent addition feeding period at an additive amount R in which R, represented by the following formula (4) is 3 or more, $$R = (\text{Intermittent addition feeding period in hours} \times (1000 \times \text{Intermittent addition concentration in mg-Cl/L})^{2.5}) / ((\text{Non-addition feeding period in hours})^{3.0} \times 10^{log\ CFU/mL}) \quad (4).$$

2. The method of membrane separation as claimed in claim 1, wherein the membrane comprises a reverse osmosis membrane.

3. The method of membrane separation as claimed in claim 1, wherein the sulfamic acid of the sulfamic acid compound is an amidosulfuric acid represented by Formula (1), $$R^1R^2NSO_3H \quad (1)$$

wherein $R^1$ and $R^2$ each separately denote H or a hydrocarbon group having a carbon number of 1-6.

4. The method of membrane separation as claimed in claim 1, wherein the intermittent addition feeding period begins before a logarithmic proliferation phase of microorganisms in the biofilm wherein a cell count increases exponentially, and the concentration of the combined chlorine treating agent is a concentration sufficient to inhibit proliferation of the microorganisms in the biofilm.

* * * * *